US012213511B2

(12) United States Patent
Bottacco et al.

(10) Patent No.: US 12,213,511 B2
(45) Date of Patent: Feb. 4, 2025

(54) DRYER FOR HERBACEOUS MATERIAL HAVING A CHANNEL-SHAPED COLLECTOR

(71) Applicant: PHILIP MORRIS PRODUCTS S.A., Neuchatel (CH)

(72) Inventors: Igor Bottacco, Feltre Belluno (IT); Pierre Buffat, Neuchatel (CH); Stefan Lauenstein, Cormondreche (CH)

(73) Assignee: Philip Morris Products S.A., Neuchatel (CH)

( * ) Notice: Subject to any disclaimer, the term of this patent is extended or adjusted under 35 U.S.C. 154(b) by 48 days.

(21) Appl. No.: 17/616,022

(22) PCT Filed: Jun. 5, 2020

(86) PCT No.: PCT/EP2020/065664
§ 371 (c)(1),
(2) Date: Dec. 2, 2021

(87) PCT Pub. No.: WO2020/245386
PCT Pub. Date: Dec. 10, 2020

(65) Prior Publication Data

US 2022/0361554 A1 Nov. 17, 2022

(30) Foreign Application Priority Data

Jun. 5, 2019 (EP) .................................... 19178497

(51) Int. Cl.
*A24B 3/04* (2006.01)
*F26B 11/02* (2006.01)
(Continued)

(52) U.S. Cl.
CPC .............. *A24B 3/04* (2013.01); *F26B 11/026* (2013.01); *F26B 11/04* (2013.01);
(Continued)

(58) Field of Classification Search
CPC ..... F26B 11/026; F26B 11/04; F26B 11/0486; F26B 25/04; F26B 2200/22; A24B 3/04
See application file for complete search history.

(56) References Cited

U.S. PATENT DOCUMENTS 2,267,259 A * 12/1941 Adt ...................... F26B 11/045
165/DIG. 143
2,499,157 A 2/1950 Peirce
(Continued)

FOREIGN PATENT DOCUMENTS

CA 2934983 12/2017
CN 101491368 7/2009
(Continued)

OTHER PUBLICATIONS

PCT International Search Report and Written Opinion for PCT/EP2020/065664 dated Apr. 8, 2021 (13 pages).
(Continued)

*Primary Examiner* — Jessica Yuen
(74) *Attorney, Agent, or Firm* — Mueting Raasch Group

(57) ABSTRACT

The Rotary dryer comprises a dryer receptacle having an inner space for receiving herbaceous material, a driving device for rotating the dryer receptacle about a rotation axis of the dryer receptacle, and a channel-shaped collector being at least partially open in its upper portion provided in the inner space of the dryer receptacle for collecting dried herbaceous material.

19 Claims, 5 Drawing Sheets

(51) Int. Cl.
*F26B 11/04* (2006.01)
*F26B 11/06* (2006.01)
*F26B 25/04* (2006.01)

(52) U.S. Cl.
CPC .......... *F26B 11/0486* (2013.01); *F26B 25/04* (2013.01); *F26B 2200/22* (2013.01)

(56) References Cited

U.S. PATENT DOCUMENTS

| | | | | |
|---|---|---|---|---|
| 2,617,545 | A | 11/1952 | Campbell | |
| 3,785,765 | A * | 1/1974 | Rowell | A24B 3/04 131/303 |
| 3,813,794 | A * | 6/1974 | Jawor | F26B 11/045 34/108 |
| 3,866,335 | A | 2/1975 | Neville | |
| 3,883,959 | A | 5/1975 | Neville | |
| 3,985,145 | A | 10/1976 | Broscheit | |
| 4,561,452 | A | 12/1985 | Gahrs | |
| 4,592,150 | A | 6/1986 | Schnupp | |
| 5,235,992 | A | 8/1993 | Sensabaugh, Jr. | |
| 5,357,984 | A | 10/1994 | Farrier | |
| 2013/0203006 | A1 | 8/2013 | Eichler | |

FOREIGN PATENT DOCUMENTS

| | | |
|---|---|---|
| CN | 202760152 | 3/2013 |
| CN | 106387984 | 2/2017 |
| CN | 108208901 | 6/2018 |
| CN | 207 978 930 | 10/2018 |
| DE | 3642993 | 6/1988 |
| DE | 8807665 | 10/1989 |
| FR | 2760524 | 9/1998 |
| GB | 264921 | 1/1927 |
| GB | 1476364 | 6/1977 |
| GB | 2 191 569 | 12/1987 |

OTHER PUBLICATIONS

International Preliminary Report on Patentability for PCT/EP2020/065664 dated Sep. 29, 2021 (18 pages).

* cited by examiner

DRYER FOR HERBACEOUS MATERIAL HAVING A CHANNEL-SHAPED COLLECTOR

This application is a U.S. National Stage Application of International Application No. PCT/EP2020/065664 filed Jun. 5, 2020, which was published in English on Dec. 10, 2020, as International Publication No. WO 2020/245386 A1. International Application No. PCT/EP2020/065664 claims priority to European Application No. 19178497.4 filed Jun. 5, 2019.

The invention relates to drying of herbaceous material, in particular tobacco material.

CN 202 760 152 U discloses a drum shaped dryer for shredded tobacco material for use in the tobacco industry. Heated air is introduced into a drying chamber of the dryer to heat the tobacco material therein. It is stated that the oxygen content of the air in the dryer has a great influence on the chemical composition of the dried tobacco. The oxygen content is controlled by implementing an oxygen/nitrogen separation system for automatically adjusting the oxygen content in the gas supplied to the dryer. To avoid ambient air from entering the dryer in an uncontrolled manner, airlock devices are provided at a tobacco inlet and a tobacco outlet of the dryer.

CN 101 491 368 A discloses a rotating drum drying device for cut tobacco. The drying device comprises a fixed outer drum and a rotatable inner drum provided therein. Heating rods are provided in a gap between the circumferential surfaces of the inner and outer drums. Further, the circumferential surface of the inner drum has a double wall forming a space receiving heating oil to be heated by the heating rods. When the heating oil is heated, the inner circumferential surface of the inner drum is heated and heat is transferred to the tobacco material provided inside the inner drum. Blades for engaging the shredded tobacco material extend from the inner circumferential surface of the inner drum towards a center of the inner drum in the radial direction. Upon rotation of the inner drum, the blades agitate the shredded tobacco provided inside the inner drum.

It is desirable to provide a drying process having a great level of accuracy and adjustability. Further, it is desirable to provide a way of drying herbaceous material yielding high quality dried material. It is further desirable to provide a way of drying herbaceous material with improved efficiency.

The invention deals with treatment of herbaceous material. In particular, the herbaceous material could be constituted of or could comprise tobacco material such as cut, ground or shredded tobacco material or combinations of cut, ground or shredded tobacco material. The herbaceous material can be used as sensorial media material in a smoking article, for example.

The invention provides a rotary dryer for drying herbaceous material. The dryer comprises a dryer receptacle having an inner space for receiving herbaceous material and a driving device for rotating the dryer receptacle about a rotation axis of the dryer receptacle.

The dryer further comprises a channel-shaped collector provided in the inner space of the dryer receptacle for collecting dried herbaceous material. The channel-shaped collector is at least partially open in its upper portion. This means that the collector has an opening that is oriented to allow herbaceous material falling down from above by gravity to enter the collector. The shape of the collector with its open upper portion allows dried herbaceous material to easily find its way into the collector, while at the same time limiting or restricting the collected material from leaving the collector back into the dryer receptacle. Further, the collector has a simple construction and is economic to implement.

The properties and quality of dried herbaceous material obtained by a drying process are strongly dependent on the drying process. For example, sensorial media materials, such as tobacco material, used in the smoking industry can express a wide range of aromas and properties according to the sequence and parameters of the drying process. Therefore, by improving collection of the herbaceous material in the inner space of the dryer receptacle, the quality of the obtained products can be improved.

Preferably, the inner space of the dryer receptacle is symmetrical with respect to the rotation axis of the dryer receptacle. A main body of the dryer receptacle may extend from a first side of the main body to a second side of the main body along a longitudinal direction. The first side of the main body may comprise a first end of the main body. The second side of the main body may comprise a second end of the main body. The longitudinal direction may in particular be parallel and coaxial to the rotation axis of the dryer receptacle. In particular, the dryer receptacle or its main body may be at least substantially cylindrically shaped. However, other shapes are conceivable, such as parallelepiped, prismatic or oval. In practice, the shape of the dryer receptacle or its main body will likely not strictly conform to the indicated shapes. For example, the dryer receptacle or its main body may comprise convey or concave portions.

The first side of the main body may be a side at which the herbaceous material is introduced into the dryer receptacle. The second side of the main body may be a side at which the herbaceous material is withdrawn from the dryer receptacle.

The dryer receptacle may comprise a first door provided at the first side of the main body. The dryer receptacle may comprise a second door provided at the second side of the main body. The doors can be opened to access the inner space of the dryer receptacle for maintenance, loading or other purposes.

The dryer receptacle may have a length in the longitudinal direction of at least 1 m, or at least 1.5 m, or at least 2 m, or at least 2.5 m. The length of the dryer receptacle in the longitudinal direction may be less than 10 m, or less than 5 m, or less than 3 m, or less than 2 m. An extension of the dryer receptacle in a direction perpendicular to the longitudinal direction may be at least 0.5 m, or at least 0.7 m, or at least 1 m, or at least 1.5 m. The extension of the dryer receptacle in the direction perpendicular to the longitudinal direction may be less than 5 m, or less than 3 m, or less than 2 m, or less than 1.5 m. A receiving capacity of the dryer receptacle may be at least 0.5 cubic meters, or at least 1 cubic meters, or at least 1.5 cubic meters, or at least 2 cubic meters, or at least 3 cubic meters. The receiving capacity of the dryer receptacle may be less than 10 cubic meters, or less than 7 cubic meters, or less than 5 cubic meters, or less than 3 cubic meters, or less than 2 cubic meters.

The driving device may be configured to rotate the dryer receptacle at between 0.2 rpm and 30 rpm, or at between 5 rpm and 20 rpm, for example. In particular, the rpm of the rotation of the dryer receptacle may be adjustable by a user.

Preferably, the rotary dryer further comprises a tilting device for adjusting a tilting angle of the dryer receptacle with respect to a horizontal plane. The tilting angle of the dryer receptacle may be defined as a tilting angle between the rotation axis of the dryer receptacle and a horizontal plane. The tilting angle can be adjusted to optimize transport and distribution of the herbaceous material within the dryer receptacle. The tilting angle may be used to set a residence time of the herbaceous material in the dryer receptacle. The tilting angle may, for example, be adjusted in view of the particle size of the herbaceous material. The tilting angle may be adjustable between 0 degree and 15 degrees, or between 0 degree and 10 degrees, for example. The tilting angle may also be periodically changed, like a rocking motion, between two or more predetermined values.

A residence time of the herbaceous material in the dryer receptacle may be between 1 min and 4 hours or between 30 min and 4 hours, or between 1 hour and 3 hours, for example. In particular, the residence time may be substantially 2 hours.

If the herbaceous material to be dried comprises different kinds of material, the different kinds of material may be supplied into the dryer receptacle one after the other to have different residence times in the dryer receptacle for the different kinds of material. The different kinds of material may comprise biologically or chemically different types of material. The different kinds of material may comprise kinds material that differ from each other in their particle size. The different kinds of material may comprise kinds material that differ from each other in their cut width, or their leaf size or their powder size.

The driving device may be configured to change a rotation direction of the dryer receptacle. By changing the rotation direction of the dryer receptacle, herbaceous material in the dryer receptacle may be subjected to a momentum and may be moved within the dryer receptacle, even if it was stuck. Changing the rotation direction of the dryer receptacle may improve the distribution of the herbaceous material in the dryer receptacle.

The dryer may be operated in a batch drying mode or in a continuous drying mode.

Preferably, the channel-shaped collector extends at least substantially parallel to the rotation axis of the dryer receptacle. In particular, the rotation axis of the dryer receptacle can extend within the channel-shaped collector. The dryer receptacle may rotate around the channel-shaped collector and may be configured such that herbaceous material falls down by means of gravity and enters the channel-shaped collector through its at least partially open upper portion.

The channel-shaped collector may be located at an end portion of the dryer receptacle with respect to the extension direction of the rotation axis. According to such an embodiment, provision of the channel-shaped collector in the inner space of the dryer receptacle is facilitated. Further, removal of the herbaceous material collected in the collector is facilitated. In particular, the channel-shaped collector can be provided at an access opening or a door of the dryer receptacle.

Preferably, the channel-shaped collector is stationary during rotation of the dryer receptacle. This ensures that the open portion of the channel-shaped collector is always oriented towards an upper side. Herbaceous material may be collected in the collector by means of gravity.

The dryer may further comprise an outlet conveyor configured to remove dried herbaceous material collected in the channel-shaped collector from the inner space of the dryer receptacle. Preferably, the outlet conveyor may remove the dried herbaceous material during rotation of the dryer receptacle. The outlet conveyor may enable a continuous mode of operation of the dryer.

The conveyor may comprise a chute for feeding the herbaceous material into the inner space of the dryer receptacle. Preferably, the outlet conveyor comprises a conveyor screw, or a scraper, or a spiral extending in the channel-shaped collector and out of the dryer receptacle. The conveyor screw, or the scraper, or the spiral can directly engage herbaceous material collected in the channel-shaped collector.

The rotary dryer may further comprise a nozzle for spraying fluid provided at an end of the conveyor screw reaching into the inner space of the dryer receptacle. Preferably, the nozzle reaches into the inner space of the dryer receptacle beyond the channel-shaped collector. The nozzle, may, for example, be used to spray liquids for treating or refining the herbaceous material during drying. The nozzle may also be used for spraying a cleaning liquid in order to clean an inside of the dryer receptacle between uses. The nozzle may be rotatable and may spray liquid to places inside the dryer receptacle that are hard to reach, such as into corners or edges of the inner space of the dryer receptacle. In particular, the nozzle may evenly distribute sprayed liquid circumferentially or axially or circumferentially and axially.

According to an embodiment, the channel-shaped collector is asymmetrical with respect to a plane defined by the rotation axis of the dryer receptacle and a vertical direction. Due to the asymmetry of the collector, entry of the herbaceous material into the collector during rotation of the dryer receptacle may be facilitated. Further, due to its asymmetry, the collector may prevent the herbaceous material from leaving the collector and returning into the inner space of the dryer receptacle.

A cross-section of the channel-shaped collector may have two sections, which are extending in different directions. Preferably, the two sections generally extend in an upwards direction. In particular, the distance between the two sections may increase in the upwards direction. This leads to the collector having a relatively large extension at its open upper portion so that herbaceous material can easily enter the collector. An opening angle defined by the two sections may be at least 30 degrees, or at least 40 degrees, or at least 45 degrees, or at least 50 degrees, or at least 60 degrees, or at least 70 degrees, or at least 80 degrees, or at least 90 degrees, or at least 100 degrees, or at least 110 degrees. The opening angle defined by the two sections may be less than 160 degrees, or less than 140 degrees, or less than 130 degrees, or less than 120 degrees, or less than 110 degrees, or less than 100 degrees, or less than 90 degrees, or less than 80 degrees, or less than 70 degrees, or less than 60 degrees, or less than 50 degrees.

Preferably, one section is shorter than the other section. In particular, the length of the shorter section could be at least 20 percent of the length of the longer section, or at least 30 percent of the length of the longer section, or at least 40 percent of the length of the longer section, or at least 50 percent of the length of the longer section, or at least 60 percent of the length of the longer section, or at least 70 percent of the length of the longer section. The length of the shorter section could be less than 90 percent of the length of the longer section, or less than 80 percent of the length of the longer section, or less than 70 percent of the length of the longer section, or less than 60 percent of the length of the longer section, or less than 50 percent of the length of the longer section, or less than 40 percent of the length of the longer section.

According to an embodiment, the channel-shaped collector comprises a center section in addition to the two sections. The two sections may extend from opposite ends of the center section as side sections. Curved or angled connection sections may connect the center section and the side sections. The center section and the side sections may be substantially flat or may be curved. In particular, the distance between the side sections may increase in a direction away from the center section, in particular in an upwards direction. This leads to the collector having a relatively large extension at its open upper portion so that herbaceous material can easily enter the collector. The herbaceous material having entered in the upper portion is then funneled towards the center section, where it may be picked up by a conveyor screw, for example.

In particular, the cross-section of the channel-shaped collector may be at least substantially U-shaped or substantially V-shaped. U-shaped means a shape having a straight or curved base section and two essentially parallel arms extending from opposing ends of the base section. V-shaped means a shape having two arms being connected to each other at first ends of the arms, the arms linearly extending away from their first ends such that a distance between the arms increases with the distance from the first ends of the arms. The channel-shaped collector may also be UN-shaped. UN-shaped means a shape having a straight or curved base section and two arms extending from opposing ends of the base section, a distance between the arms increasing with increasing distance from the base section.

Preferably, a dimension of the channel-shaped collector in a direction perpendicular to the rotation axis of the dryer receptacle is smaller than half, or smaller than a third or smaller than a quarter of a dimension of the inner space of the dryer receptacle in the direction perpendicular to the rotation axis. This ensures that the herbaceous material has enough space in the dryer receptacle to be moved around to ensure high drying efficiency without being obstructed by the collector.

The rotary dryer may comprise a collector heating element configured to heat the channel-shaped collector. Heating the collector may remove residual moisture, before the herbaceous material leaves the inner space of the dryer receptacle. In particular, the collector heating element can, for example, comprise an electrical resistance heating element. An electrical resistance heating element allows direct, fast and accurate control over the heating power. Alternatively, the collector heating element may comprise a heating fluid line through which heating fluid flows. Heating by a heating fluid line provides improved heat transfer and simplified control over the heating temperature. For example thermal oil, or steam, or superheated steam, or water, or pressured water may be used as heating fluid. The collector heating element could also comprise a radiation heating element.

The invention also provides a method for drying herbaceous material. The method comprises rotating a dryer receptacle receiving the herbaceous material about a rotation axis of the dryer receptacle and collecting dried herbaceous material in the dryer receptacle in a collector comprising a plate partially surrounding the rotation axis. The collector has a simple structure and is easy to manufacture. Nevertheless, the plate partial surrounding the rotation axis allows efficiently collecting dried herbaceous material for removal from the dryer receptacle. The collector allows the removal of material from the center of the dryer receptacle.

Preferably, the collector is decoupled from the rotation of the dryer receptacle. This ensures that the plate surrounds the rotation axis such that the open portion is oriented upwards to let the herbaceous material to enter the collector and fall into the plate to be collected by gravity.

The method may further comprise conveying the dried herbaceous material collected in the collector out of the dryer receptacle. Preferably, this is done by use of a conveyor screw, which is adapted to efficiently pick up the herbaceous material collected in the plate partially surrounding the rotation axis. The herbaceous material may be removed from the dryer receptacle during rotation of the dryer receptacle or while the dryer receptacle does not rotate.

According to an embodiment, the method further comprises treating volatiles evaporated in the dryer receptacle. The volatiles may comprise material evaporated from the herbaceous material during drying. Such volatiles may, for example, carry flavor extracted from the herbaceous material. Volatiles to be treated could, for example, comprise aromatic substances or oils. The volatiles could comprise, for example, alkaloids such as nicotine. The volatiles could also comprise pyrazines such as for example: 2-methylpyrazine; 2,5-dimethylpyrazine; 2,6-dimethylpyrazine; 2-ethylpyrazine; 2,3-dimethylpyrazine; 2-ethyl-5-methylpyrazine; 2-ethyl-6-methylpyrazine; 2,3,5-trimethyl Pyrazine; tetramethylpyrazine; 2-ethyl-3,6-dimethylpyrazine; or 2-ethyl-3,5-dimethylpyrazine. Other examples of volatiles include β-ionone; β-damascenone; or acetic acid.

According to an embodiment, current environmental properties may be used to determine one or more drying process parameters. Examples for drying process parameters are the rpm of the dryer receptacle, a temperature profile in the inner space of the dryer receptacle, a treatment time of the herbaceous material, or the tilting angle. The environmental properties may comprise properties of the herbaceous material to be dried, for example.

Additionally or alternatively, environmental properties of previous drying operations may be used to determine one or more process parameters.

In particular, machine learning may be used to determine one or more drying process parameters based on current environmental properties, environmental properties of previous drying operations and data collected during previous drying operations.

The invention also provides a use of a curved plate for collecting herbaceous material during a drying process of herbaceous material in a rotating dryer receptacle.

The invention further provides a rotary dryer for drying herbaceous material as described in the following. Features of that dryer may be combined with any one of the above-described dryers, methods or uses. The dryer comprises a dryer receptacle having an inner space for receiving the herbaceous material and a driving device for rotating the dryer receptacle about a rotation axis thereof.

Vanes for engaging the herbaceous material received in the inner space of the dryer receptacle extend from an inner surface of the dryer receptacle into the inner space of the dryer receptacle. The inner surface may at least partially define the inner space of the dryer receptacle. In particular, the inner surface may be a circumferential surface of the dryer receptacle. Upon rotation of the dryer receptacle, the vanes may engage and agitate the herbaceous material. Hence, heat within the dryer receptacle can easily reach the herbaceous material. Due to the vanes, the herbaceous material may be evenly heated. The vanes may contribute to evenly distributing the herbaceous material within the dryer receptacle.

In a cross-section with a sectional plane perpendicular to the rotation axis of the dryer receptacle, the vanes are inclined with respect to the radial direction. The radial direction is perpendicular to the rotation axis and radial to the rotation axis of the dryer receptacle. The inclination of the vanes allows the vanes to better engage and agitate the herbaceous material within the inner space of the dryer receptacle. In particular, the vanes can easily immerse into herbaceous material located at a bottom of the inner space of the dryer receptacle upon rotation of the dryer receptacle and pick up herbaceous material. As a matter of geometry, the inclined vanes may spoon the herbaceous material on their surface, thus keeping it in contact with the vanes for longer than radial vanes could. The inclined vanes may form pockets together with the inner surface of the dryer receptacle, which allows temporarily holding the herbaceous material during rotation of the dryer receptacle, thereby increasing agitation and distribution of the herbaceous material in the dryer receptacle.

The properties and quality of dried herbaceous material obtained by a drying process are strongly dependent on the drying process. For example, sensorial media materials, such as tobacco material, used in the smoking industry can express a wide range of aromas and properties according to the sequence and parameters of the drying process. Therefore, by improving agitation or heating of the herbaceous material, the quality of the obtained products can be improved.

In the cross-section with the sectional plane perpendicular to the rotation axis, the angles between the vanes and the radial direction are preferably lower than 30 degrees. In particular, the angles can be between 5 degrees and 25 degrees or more preferably between 5 degrees and 15 degrees. The indicated ranges may be suitable for temporarily holding the herbaceous material in the pockets formed by the vanes and the inner surface of the dryer receptacle whilst still allowing the herbaceous material to be easily picked up by the vanes.

In principle, any number of vanes can be provided in the dryer receptacle. Preferably, there are at least four, at least six, at least eight, at least ten or at least sixteen vanes. A higher number of vanes increases agitation of the herbaceous material within the dryer receptacle, as long as there is still enough space in between adjacent vanes. Preferably, there are less than 32, less than 28, less than 24, less than 20, less than 16, less than 12 or less than 8 vanes.

According to an embodiment, the vanes have a parallelepiped shape. Such vanes are easy to manufacture and arrange within the dryer receptacle. However, other shapes of the vanes are conceivable. In particular, the vanes may have a curvature in the cross-section with the sectional plane perpendicular to the rotation axis. Curved vanes may be able to better engage and pick up the herbaceous material. Preferably, the curvature of the vanes is a curvature in the direction of the inclination of the vanes. This may increase the period of the rotation of the dryer receptacle during which herbaceous material is held on the vanes.

According to an embodiment, the vanes can extend along the inner surface of the dryer receptacle in parallel to the rotation axis of the dryer receptacle. The herbaceous material may be evenly agitated along the longitudinal extension of the dryer receptacle.

Alternatively, the vanes may extend along the inner surface of the dryer receptacle on paths that are superpositions of an extension parallel to the rotation axis and a rotation about the rotation axis. Such "twisted" extension of the vanes may contribute to transport of herbaceous material parallel to the rotation axis of the dryer receptacle.

Preferably, an arch distance between two adjacent vanes with respect to the rotation axis is equal to or greater than a height dimension of the vanes. This may ensure that adjacent vanes interfere less with picking up herbaceous material by a vane and may optimize the amount of engaged material per revolution of the dryer receptacle. The term "arch distance" does not require that the inner surface of the dryer receptacle between the adjacent vanes has a curvature along the arch. For example, the inner surface could be flat between two adjacent vanes. The arch distance can be defined as the length of a section line of a portion of the inner surface of the dryer receptacle between two adjacent vanes with a plane perpendicular to the rotation axis of the dryer receptacle. The height dimension of the vanes may be defined as the length of a line that, in the cross-section with the sectional plane perpendicular to the rotation axis, connects a center point of a radially outer base portion of the vane at the interface of the vane with the inner surface of the dryer receptacle to a center point of the radially inner far end of the vane.

For example, the height dimension of the vanes could be at least 10 cm, or at least 15 cm, or at least 20 cm, or at least 25 cm, or at least 30 cm, or at least 40 cm, or at least 50 cm. The height dimension of the vanes could be less than 50 cm, or less than 40 cm, or less than 30 cm, or less than 20 cm, or less than 10 cm. The arch distance could, be at least 10 cm, or at least 15 cm, or at least 20 cm, or at least 25 cm, or at least 30 cm, or at least 40 cm, or at least 50 cm. The arch distance could be less than 1 m, or less than 70 cm, or less than 50 cm, or less than 40 cm, or less than 30 cm, or less than 20 cm. The height dimension of the vanes could, for example, be at least 5 percent of an inner diameter of the dryer receptacle, or at least 7 percent of an inner diameter of the dryer receptacle, or at least 10 percent of an inner diameter of the dryer receptacle, or at least 12 percent of an inner diameter of the dryer receptacle, or at least 15 percent of an inner diameter of the dryer receptacle, or at least 17 percent of an inner diameter of the dryer receptacle. The height dimension of the vanes could, for example, be less than 25 percent of an inner diameter of the dryer receptacle, or less than 22 percent of an inner diameter of the dryer receptacle, or less than 20 percent of an inner diameter of the dryer receptacle, or less than 17 percent of an inner diameter of the dryer receptacle, or less than 15 percent of an inner diameter of the dryer receptacle.

The rotary dryer preferably further comprises vane heating elements incorporated into the vanes for heating the herbaceous material. The vane heating elements may contribute to drying the herbaceous material. Heating the vanes with the heating elements incorporated into the vanes synergizes with the inclination with the vanes with respect to the radial direction. As described above, due to the inclination of the vanes, the herbaceous material is held by the vanes for an increased fraction of the rotation of the dryer receptacle. Therefore, the herbaceous material is subjected to the heat from the heating elements incorporated into the vanes for an increased amount of time.

The rotary dryer can further comprise a liquid dispersion assembly comprising at least one nozzle assembly rotatably provided inside the inner space of the dryer receptacle and configured to spray liquid. The nozzle, may, for example, be used to spray liquids for treating or refining the herbaceous material during drying. The nozzle may also be used for spraying a cleaning liquid in order to clean an inside of the dryer receptacle between uses. As the nozzle can be rotated, the nozzle can spray liquid to places that are hard to reach inside the dryer receptacle, such as, for example, into the pockets formed between the vanes and the inner surface of the dryer receptacle.

The rotary dryer may further comprise a conveyor for feeding herbaceous material into the inner space of the dryer receptacle. The conveyor may comprise a chute for feeding the herbaceous material into the inner space of the dryer receptacle. The conveyor may comprise a conveyor screw, a scraper or a spiral for feeding the herbaceous material into the inner space of the dryer receptacle.

The invention further provides a method for drying herbaceous material as described in the following. Features of that method may be combined with any one of the above-described dryers, methods or uses. The method comprises introducing the herbaceous material into an inner space of a dryer receptacle having vanes extending from an inner surface of the dryer receptacle into the inner space of the dryer receptacle. The dryer receptacle having the herbaceous material received therein is rotated about a rotation axis of the dryer receptacle in a direction of rotation. During rotation, the herbaceous material received in the dryer receptacle is engaged with engagement surfaces of the vanes. This agitates the herbaceous material in the dryer receptacle and facilitates drying. The vanes are arranged such that in a sectional plane perpendicular to the rotation axis of the dryer receptacle, angles between the vanes and the inner surface of the dryer receptacle are larger when measured in the direction of rotation of the dryer receptacle than when measured against the direction of rotation of the dryer receptacle. As the angle is smaller when measured against the direction of rotation of the dryer receptacle, the vanes are arranged to more easily engage with herbaceous material collected at a bottom of the dryer receptacle upon rotation, thereby collecting material between the vanes and the inner surface of the dryer receptacle.

The method can further comprise temporarily capturing herbaceous material between the engagement surface of the vanes and the inner surface of the dryer receptacle during rotation of the dryer receptacle. Preferably, the herbaceous material is captured between the engagement surfaces of the vanes and the inner surface of the dryer receptacle for at least a quarter of the rotation, or at least a third of the rotation, or at least half of the rotation, or more than half of the rotation of the dryer receptacle.

The method may further comprise actively heating the vanes, preferably using vane heating elements incorporated into the vanes.

The invention further provides a use of asymmetrical structures on an inner surface of a rotating dryer receptacle receiving herbaceous material for influencing the distribution of the herbaceous material during rotation of the dryer receptacle. The asymmetrical structures may in particular be asymmetrical with respect to a rotation axis of the dryer receptacle. Use of asymmetrical structures may lead to improved agitation of the herbaceous material in the dryer receptacle. Further, use of asymmetrical structures may improve heat distribution to the herbaceous material. Due to the use of the asymmetrical structures, drying efficiency and quality may be improved.

In particular, the asymmetrical structures may be asymmetrical with respect to a radial direction.

The invention further provides a dryer for drying herbaceous material as described in the following. Features of that dryer may be combined with any one of the above-described dryers, methods or uses. The dryer comprises a dryer receptacle having an inner space for receiving the herbaceous material, an access assembly providing access to the inner space of the dryer receptacle and a heating system.

The access assembly may provide access to the inner space of the dryer receptacle for introducing the herbaceous material into the dryer receptacle or withdrawing herbaceous material from the dryer receptacle. The access assembly may provide access to the inner space of the dryer receptacle for introducing or withdrawing any other material that is treated together with the herbaceous material. The access assembly may provide access to the inner space of the dryer receptacle for introducing or withdrawing any other material that is used for treating the herbaceous material in the dryer receptacle. The access assembly may provide access to the inner space of the dryer receptacle for maintenance and related purposes, for example.

The heating system comprises at least one access heating element for actively heating the access assembly. Preferably, the at least one access heating element is incorporated into the access assembly. Heating the access assembly may prevent or reduce formation of lower temperature spots at the access assembly.

Lower temperature spots could lead to condensation of gaseous material in the dryer assembly such as water, aromatic substances, oils, or volatiles extracted from the herbaceous material during drying.

Condensation of gaseous material in the dryer receptacle could negatively influence drying efficiency. Condensation of gaseous material in the dryer receptacle could negatively influence the chemical composition and quality of the dried products. In particular, herbaceous material to be dried could stick and conglomerate at lower temperature spots due to humidity. Condensation at lower temperature spots could also create cleaning effort. In particular, there may be caramellization that is difficult to remove at condensation points within the dryer receptacle.

Further, heating the access assembly may facilitate maintaining a desired temperature within the dryer receptacle. Heating the access assembly may facilitate obtaining a desired temperature profile within the dryer receptacle. Heating the access assembly may facilitate optimizing drying efficiency and quality. A desired temperature profile could, for example, be a uniform temperature throughout the dryer receptacle, for example between 20 degrees Celsius and 200 degrees Celsius, or between 100 degrees Celsius and 200 degrees Celsius, or between 100 degrees Celsius and 150 degrees Celsius, or between 120 degrees Celsius and 150 degrees Celsius. Due to convection or conduction heat losses, this may require uniform heating. A desired temperature profile could also be a non-constant temperature profile, for example a time dependent or moisture dependent temperature profile.

The properties and quality of dried herbaceous material obtained by a drying process are strongly dependent on the drying process. For example, sensorial media materials, such as tobacco material, used in the smoking industry can express a wide range of aromas and properties according to the sequence and parameters of the drying process. Therefore, by improving heating of the herbaceous material or preventing lower temperature spots, the quality of the obtained products can be improved.

According to an embodiment, the access assembly comprises a door provided at the dryer receptacle and the at least one access heating element comprises a door heating element incorporated into the door. The door may be opened to access the inner space of the dryer receptacle for maintenance, loading or other purposes. An inner surface of the door may be part of an inner surface of the dryer receptacle. Therefore, heating the door may contribute to controlling the temperature of the inner surface of the dryer receptacle.

The access assembly may comprise at least one of an inlet conveyor for supplying herbaceous material into the inner space of the dryer receptacle and an outlet conveyor for the removing herbaceous material from the inner space of the dryer receptacle. The at least one access heating element may comprise a conveyor heating element incorporated into the conveyor (inlet conveyor or outlet conveyor or both).

Heating the inlet conveyor or the outlet conveyor may prevent formation of lower temperature spots at the respective conveyor. Further, in the case of heating the inlet conveyor, the herbaceous material is preheated at the inlet conveyor before actually entering into the inner space of the dryer receptacle. This may prevent or reduce temperature reduction within the inner space of the dryer receptacle upon introduction of new herbaceous material or ensure a uniform temperature of all herbaceous material in the dryer directly after its introduction into the dryer receptacle. In the case of heating the outlet conveyor, the herbaceous material may be subjected to a final heating at the outlet conveyor to remove residual moisture.

The at least one access heating element can, for example, comprise an electrical resistance heating element. An electrical resistance heating element allows direct, fast and accurate control over the heating power. Alternatively, the at least one access heating element may comprise a heating fluid line through which heating fluid flows. Heating by a heating fluid line provides improved heat transfer and simplified control over the heating temperature. For example thermal oil, or steam, or superheated steam, or water, or pressured water may be used as heating fluid. The at least one access heating element could also comprise a radiation heating element. A further example of an access heating element is an annular furnace.

Preferably, a temperature sensor for determining an access assembly temperature is provided. The access assembly temperature may, in particular, be a temperature of the access assembly or a temperature at the access assembly. The access assembly temperature may be a temperature of a door of the dryer receptacle or a temperature at a door of the dryer receptacle. The access assembly temperature may be a temperature of an inlet conveyor for supplying herbaceous material into the inner space of the dryer receptacle or a temperature at an inlet conveyor for supplying herbaceous material into the inner space of the dryer receptacle. The access assembly temperature may be a temperature of an outlet conveyor for removing herbaceous material from the inner space of the dryer receptacle or a temperature at an outlet conveyor for removing herbaceous material from the inner space of the dryer receptacle. The access assembly temperature determined by the temperature sensor may be used for controlling the at least one access heating element.

According to an embodiment, the dryer further comprises a controller configured to control the at least one access heating element to maintain at least a predetermined minimum access assembly temperature. The controller may control the at least one access heating element based on an access assembly temperature provided by a temperature sensor or multiple temperature sensors. The minimum access assembly temperature may be chosen in accordance with the specific drying process. For example, the minimum access assembly temperature may be between 15 degrees Celsius and 250 degrees Celsius, or between 20 degrees Celsius and 200 degrees Celsius, or between 100 degrees Celsius and 200 degrees Celsius, or between 100 degrees Celsius and 150 degrees Celsius, or between 120 degrees Celsius and 150 degrees Celsius.

The heating system may further comprise at least one wall heating element that is incorporated into a wall of the dryer receptacle. In particular, the at least one wall heating element may be incorporated into a circumferential wall of the dryer receptacle or a wall of a main body of the dryer receptacle.

The heating system may further comprise a vane heating element for actively heating at least one vane extending from an inner surface of the dryer receptacle into the inner space of the dryer receptacle.

The at least one wall heating element or the at least one vane heating element or both may comprise a electrical resistance heating element, a heating fluid line through which heating fluid flows, a radiation heating element or an annular furnace.

Heating the wall of the dryer receptacle or at least one vane of the dryer receptacle or both allows maintaining or attaining a desired temperature in the dryer receptacle. For example, a temperature in the dryer receptacle can range from 15 degrees Celsius to 250 degrees Celsius, or from 20 degrees Celsius to 200 degrees Celsius, or from 100 degrees Celsius to 200 degrees Celsius, or from 100 degrees Celsius to 150 degrees Celsius, or from 120 degrees Celsius to 150 degrees Celsius.

According to a preferred embodiment, the at least one access heating element comprises a plurality of access heating elements that are arranged to be independently controlled. Independent control of different access heating elements allows setting up different heating zones according to a desired temperature profile or temperature distribution to optimize drying. For example, a temperature could be higher or lower at an inlet side of the dryer receptacle where the herbaceous material enters the dryer receptacle than at an outlet side of the dryer receptacle where the herbaceous material exits the dryer receptacle. Alternatively or additionally, a temperature in a middle region of the dryer receptacle between the inlet side and the outlet side could be higher or lower than a temperature at the inlet side or than a temperature at an outlet side.

The invention further provides a method for drying herbaceous material as described in the following. Features of that method may be combined with any one of the above-described dryers, methods or uses. The method comprises heating the herbaceous material in an inner space of a dryer receptacle. An inner surface of the dryer receptacle is heated so that the entire inner surface of the dryer receptacle is maintained above a condensation temperature of gases evaporated inside the dryer receptacle during heating of the herbaceous material. The condensation temperature may be at least 20 degrees Celsius, or at least 30 degrees Celsius, or at least 50 degrees Celsius, or at least 80 degrees Celsius, or at least 120 degrees Celsius. The complete inner surface of the dryer receptacle defining the inner space of the dryer receptacle may be heated to be fully maintained above the condensation temperature. This prevents condensation of gaseous material inside the dryer receptacle during heating. Condensation could negatively influence drying efficiency and quality of the dried products. The gases evaporated inside the dryer receptacle during heating of the herbaceous material may be gases that are extracted from the herbaceous material during heating of the herbaceous material. Examples for gases evaporated inside the dryer receptacle during heating of the herbaceous material are water, aromatic substances, oils and volatiles extracted from the herbaceous material during drying.

In particular, the inner surface of the dryer receptacle can be heated to 15 degrees Celsius to 250 degrees Celsius, or 20 degrees Celsius to 200 degrees Celsius, or 100 degrees Celsius to 200 degrees Celsius, or 100 degrees Celsius to 150 degrees Celsius, or 120 degrees Celsius to 150 degrees Celsius.

The method may further comprise actively heating an inlet conveyor for supplying herbaceous material into the inner space of the dryer receptacle at least above the condensation temperature. The method may further comprise actively heating an outlet conveyor for removing the herbaceous material from the inner space of the dryer receptacle at least above the condensation temperature. Heating the inlet conveyor is preferably achieved with a conveyor heating element incorporated into the inlet conveyor. Heating the outlet conveyor is preferably achieved with a conveyor heating element incorporated into the outlet conveyor. Preferably, the inlet conveyor or the outlet conveyor or the inlet conveyor and the outlet conveyor is heated to be maintained above the condensation temperature.

The method may further comprise actively heating at least one door of the dryer receptacle, preferably by a door heating element incorporated into the door.

According to an embodiment, a first door and a second door of the dryer receptacle provided at opposing sides of the dryer receptacle are actively heated to different temperatures. Different temperature zones may be established in the dryer receptacle to optimize the drying process.

The invention also provides a use of an access heating element for actively heating an access assembly providing access to the inner space of a dryer receptacle for receiving herbaceous material to prevent formation of lower temperature spots at which gaseous material generated during drying of the herbaceous material can condensate.

The invention further provides a dryer for drying herbaceous material as described in the following. Features of that dryer may be combined with any one of the above-described dryers, methods or uses. The dryer comprises a dryer receptacle having an inner space for receiving the herbaceous material, a heating system for heating the herbaceous material and a controller configured to control the heating system.

The heating system comprises heating sub-systems. The controller is configured to control the heating sub-systems independently of each other. Independent control of the heating sub-systems allows adjusting heating to specific requirements for specific regions of the dryer. For example, different temperature zones can be set up to optimize the drying process of the herbaceous material. However, it is also possible within the scope of the invention to have different control characteristics for different heating sub-systems without having distinct temperature zones. For example, at least one or several heating sub-systems could have different feedback control parameters than other heating sub-systems. Thus, the at least one or several heating sub-systems may react with more or less heating power or faster or slower to deviations from the temperature target value. Independent control over the heating sub-systems provides a high level of adjustability of the drying process.

The properties and quality of dried herbaceous material obtained by a drying process are strongly dependent on the drying process. For example, sensorial media materials, such as tobacco material, used in the smoking industry can express a wide range of aromas and properties according to the sequence and parameters of the drying process. Independent control over the heating sub-systems allows influencing the quality of the dried material to high degree.

Preferably, each of the heating sub-systems comprises at least one heating element. The at least one heating element can, in particular, comprise at least one resistance heating element. An electrical resistance heating element allows direct, fast and accurate control over the heating power. Alternatively or additionally, the at least one heating element may comprise a heating fluid line through which heating fluid flows. Heating by a heating fluid line provides improved heat transfer and simplified control over the heating temperature. Further, steady control over the heating temperature can be provided. For example, thermal oil, or steam, or superheated steam, or water, or pressured water may be used as heating fluid. The at least one heating element could also comprise a radiation heating element. A further example of an access heating element is an annular furnace.

The heating sub-systems can comprise one or more main body heating sub-systems for heating a main body of the dryer receptacle. Preferably, at least two, or at least three, or at least four, or at least five, or more than five main body heating sub-systems for heating distinct sections of the main body of the dryer receptacle are provided. This allows independently controlling heating of different sections of the main body of the dryer receptacle. According to an embodiment, different temperature sections having different temperatures are established along a longitudinal extension direction of the dryer receptacle. For example, a higher temperature zone may be established near an entrance for feeding herbaceous material into the inner space of the dryer receptacle, so that moisture of the relatively wet herbaceous material entering the dryer receptacle is evaporated. For example, a higher temperature zone may be provided at an exit at which the herbaceous material leaves the dryer receptacle, so that residual moisture in the herbaceous material is removed.

The main body heating sub-systems may each comprise a wall heating element incorporated into a wall of the main body of the dryer receptacle. Additionally or alternatively, the main body heating sub-systems may each comprise a vane heating element incorporated into a vane extending from an inner surface of the dryer receptacle into the inner space of the dryer receptacle.

The heating sub-systems may comprise one or more access heating sub-systems incorporated into an access assembly providing access to the inner space of the dryer receptacle. Heating the access assembly may, for example, prevent or reduce formation of lower temperature spots at the access assembly. Lower temperature spots could lead to condensation of gaseous material in the dryer assembly such as water, aromatic substances, oils, or volatiles extracted from the herbaceous material during drying. Condensation of gaseous material in the dryer receptacle could negatively influence drying efficiency. Condensation of gaseous material in the dryer receptacle could negatively influence the chemical composition and quality of the dried products. In particular, herbaceous material to be dried could stick and conglomerate at lower temperature spots due to humidity. Condensation at lower temperature spots could also create cleaning effort. Further, heating the access assembly may facilitate maintaining a desired temperature within the dryer receptacle. Heating the access assembly may facilitate obtaining a desired temperature profile within the dryer receptacle. Heating the access assembly may facilitate optimizing drying efficiency and quality. A desired temperature profile could, for example, be a uniform temperature throughout the dryer receptacle, for example between 20 degrees Celsius and 200 degrees Celsius, or between 100 degrees Celsius and 200 degrees Celsius, or between 100 degrees Celsius and 150 degrees Celsius, or between 120 degrees Celsius and 150 degrees Celsius. Due to convection or conduction heat losses, this may require uniform heating. A desired temperature profile could also be a non-constant temperature profile, for example a time dependent or moisture dependent temperature profile.

The one or more access heating sub-systems may comprise one or more door heating elements incorporated into a door of the dryer receptacle. Heating the door may contribute to controlling the temperature of the inner surface of the dryer receptacle and may be used to create a locally different zone at the door, in particular in order to prevent condensation.

The one or more access heating sub-systems may comprise one or more conveyor heating element for heating an inlet conveyor for supplying herbaceous material into the inner space of the dryer receptacle or an outlet conveyor for the removing herbaceous material from the inner space of the dryer receptacle. Heating the inlet conveyor or the outlet conveyor may prevent formation of lower temperature spots at the respective conveyor. Further, in the case of heating the inlet conveyor, the herbaceous material is preheated at the inlet conveyor before or while entering into the inner space of the dryer receptacle. The herbaceous material may also be preheated at the inlet conveyor before and while entering into the inner space of the dryer receptacle. Heating the inlet conveyor may prevent temperature reduction within the inner space of the dryer receptacle upon introduction of new herbaceous material. In the case of heating the outlet conveyor, the herbaceous material may be subjected to a final heating at the outlet conveyor to remove residual moisture.

The heating sub-systems may comprise a collector heating sub-system. The collector heating sub-system may comprise one or more collector heating elements for heating a collector provided inside the inner space of the dryer receptacle to collect herbaceous material.

The dryer may further comprise sensors determining temperatures corresponding to respective heating sub-systems. According to an embodiment, one sensor corresponds to one heating sub-system and determines a temperature corresponding to that one heating sub-system, which may be a temperature in a temperature zone heated by the heating sub-system. Alternatively, a sensor may provide a control feedback value to more than one heating sub-system and may determine a temperature corresponding to the more than one heating sub-systems, which may be a temperature in the temperature zone heated by the corresponding heating sub-systems. The sensors may comprise one or more temperature sensors. The sensors may also comprise one or more steam sensors. In particular, one or more steam sensors may be used when to determine the temperature in the dryer receptacle, when heating with superheated steam.

A controller may be configured to control the heating sub-systems based on an output from the sensors. In particular the controller may be configured to control each heating sub-system or each group of heating sub-systems based on an output from the corresponding temperature sensor.

The controller may be configured to control the heating sub-systems based on different temperature target values for different heating sub-systems. This allows establishing different temperature zones having different temperatures to optimize the drying process. Preferably, the temperature target values for the heating sub-systems can be set or selected by a user.

Preferably, heating system information is routed to the controller wirelessly. Data from the heating-sub systems may be wirelessly transmitted to the controller. In particular, measurement data from the sensors may be wirelessly transmitted to the controller. Additionally or alternatively, the controller may be configured to wirelessly transmit instructions or data or instructions and data to the heating sub-systems.

According to an embodiment, the heating sub-systems are arranged one behind the other along the rotation axis. This allows, for example, establishing different temperature zones or different temperature control zones along the rotation axis.

The invention further provides a method for drying herbaceous material as described in the following. Features of that method may be combined with any one of the above-described dryers, methods or uses. The method comprises controlling heating elements for heating herbaceous material in a dryer receptacle. Different heating elements or groups of heating elements are independently controlled.

Preferably, the different heating elements or groups of heating elements are controlled according to different temperature target values.

According to an embodiment, temperature target values for heating elements provided at a side of the dryer receptacle, where herbaceous material is supplied to the dryer receptacle, are higher than temperature target values at the side of the dryer receptacle where herbaceous material is removed from the dryer receptacle. Due to the higher temperature at the side where the herbaceous material enters the dryer receptacle, the relatively wet herbaceous material entering the dryer receptacle is subjected to comparatively high temperatures so that the moisture content is quickly reduced. As the herbaceous material is generally drier at the side of the dryer receptacle where the herbaceous material is removed from the dryer receptacle, the danger of damaging or burning the herbaceous material due to high temperature is higher at that side of the dryer receptacle. Due to the lower temperature target value at the side where the herbaceous material is removed from the dryer receptacle, damaging of the herbaceous material is prevented or the risk of damage to the herbaceous material is reduced.

Alternatively, temperature target values for heating elements provided at a side of the dryer receptacle where herbaceous material is supplied to the dryer receptacle are lower than temperature target values at the side of the dryer receptacle where herbaceous material is removed from the dryer receptacle. This allows gently heating the herbaceous material upon entering the dryer receptacle to avoid damaging loss of flavorful components, in particular volatiles, such as flavorful components or oils. When the moisture of the herbaceous material is reduced and the herbaceous material has progressed to the side of the dryer receptacle, where the herbaceous material is removed from the dryer receptacle, a higher temperature can remove residual moisture.

The invention also provides a use of heating elements for creating a temperature profile in an inner space of a dryer receptacle receiving herbaceous material to be dried. Preferably, the temperature profile extends along a rotation axis of the dryer receptacle. The temperature profile may comprise a temperature gradient.

The disclosure pertains to a dryer for drying herbaceous material, to a method for drying herbaceous material and to a use. Features, advantages and explanations presented in connection with any one of those aspects also apply to, can be combined with and may be transferred to any one of the other aspects.

In the following, the invention is further described by describing embodiments of the invention with reference to the Figures.

Figure 1:
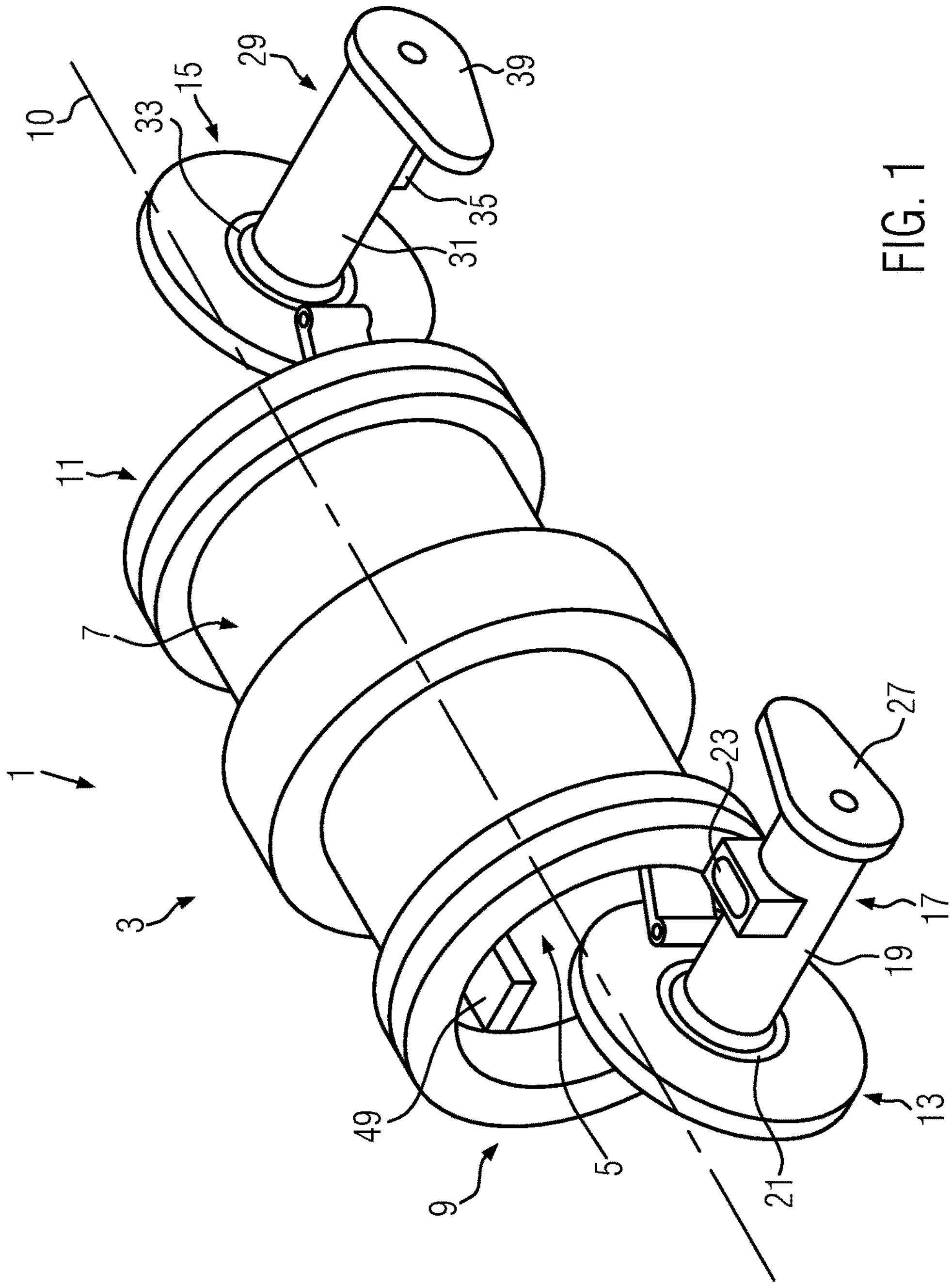
FIG. 1 shows a schematic perspective view of a dryer for drying herbaceous material according to an embodiment of the invention.

FIG. 1 shows a schematic partial view of a rotary dryer 1 for drying herbaceous material, in particular tobacco material. The rotary dryer 1 comprises a dryer receptacle 3 having an inner space 5 for receiving the herbaceous material. The dryer receptacle 3 can be rotated about a rotation axis 10 of the dryer receptacle 3. The dryer receptacle 3 comprises a main body 7 extending from a first side 9 of the main body 7 (inlet side according to the present embodiment) to a second side 11 of the main body 7 (outlet side according to the present embodiment) along the rotation axis 10. In the illustrated embodiment, the main body 7 of the dryer receptacle 3 is substantially cylindrically shaped. However, also other shapes of the main body 7 are conceivable, such as a prismatic shape, for example. The dryer receptacle 3 further comprises a first door 13 provided at the first side 9 of the main body 7. Further, the dryer receptacle 3 comprises a second door 15 provided at the second side 11 of the main body 7. The doors 13, 15 can be opened to access the inner space 5 of the dryer receptacle 3 for maintenance or loading. When closed, the doors 13, 15 provide a substantially airtight seal together with the main body 7 of the dryer receptacle 3. The substantially airtight seal allows control over gases flowing into and out of the inner space 5 of the dryer receptacle 3. For example, the oxygen content in the inner space 5 of the dryer receptacle 3 may be controlled. According to an embodiment, there is an overpressure in the inner space 5 of the dryer receptacle 3 to avoid ambient atmosphere from entering the inner space 5 of the dryer receptacle 3 in an uncontrolled manner. When the dryer receptacle 3 is rotated, the main body 7 and the doors 13, 15 rotate together.

Figure 2:
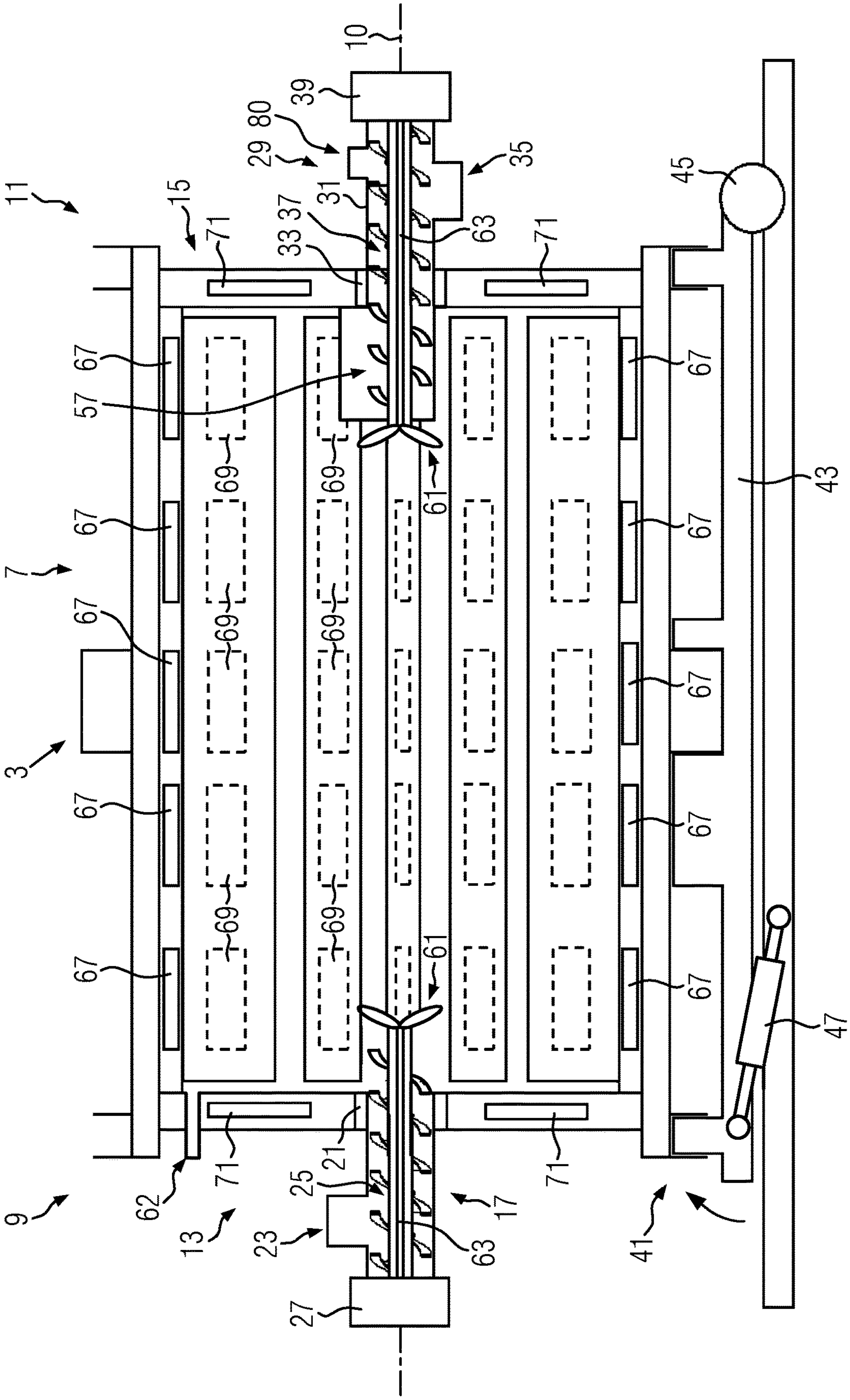
FIG. 2 shows a schematic sectional view through the dryer according to the embodiment of the invention with the sectional plane being parallel to the rotation axis of the dryer receptacle.

In some embodiments, the herbaceous material may be manually or automatically loaded into or removed from the dryer receptacle 3 through the opened doors 13, 15. In the illustrated embodiment, however, the herbaceous material is loaded into and withdrawn from the inner space 5 of the dryer receptacle 3 when the doors 13, 15 are closed. An inlet system 17 is provided at the first door 13 to feed herbaceous material into the dryer receptacle 3. The inlet system 17 comprises an inlet duct 19 extending through a central opening in the door 13. The inlet duct 19 is stationary and does not rotate together with the dryer receptacle 3. The inlet duct 19 is connected to the first door 13 via a substantially airtight rotation decoupling seal 21. Herbaceous material to be supplied to the inner space 5 of the dryer receptacle 3 is supplied to an inlet 23 of the inlet system 17. As illustrated in FIG. 2, an inlet conveyor 25 is provided inside the inlet duct 19. In the illustrated embodiment, the inlet conveyor 25 comprises a conveyor screw that is rotated by a drive assembly 27 about a rotation axis that is parallel and coaxial to the rotation axis 10 of the dryer receptacle 3. Alternatively, the inlet conveyor 25 may comprise a rotated spiral for feeding the herbaceous material into the inner space 5 of the dryer receptacle 3. As another alternative, the inlet conveyor 25 may comprise a scraper configured to move back and forth for feeding the herbaceous material into the inner space 5 of the dryer receptacle 3. If the inlet conveyor 25 comprises, for example, a conveyor screw, or a rotated spiral, or a scraper, the inlet conveyor 25 comprises an active conveying system. However, the inlet conveyor 25 could alternatively be configured as passive conveying system. In particular, the inlet conveyor 25 could comprise a chute for feeding the herbaceous material into the inner space 5 of the dryer receptacle 3. The inlet conveyor 25 could be configured to feed the herbaceous material into the inner space 5 of the dryer receptacle 3 without using any actively driven components. The inlet conveyor 25 conveys herbaceous material supplied to the inlet 23 of the inlet system 17 into the inner space 5 of the dryer receptacle 3.

Analogously, an outlet system 29 is provided at the second door 15 to withdraw herbaceous material from the inner space 5 of the dryer receptacle 3. The outlet system 29 comprises an outlet duct 31 extending through a central opening in the door 15. The outlet duct 31 is stationary and does not rotate together with the dryer receptacle 3. The outlet duct 31 is connected to the second door 15 via a substantially airtight rotation decoupling seal 33. As illustrated in FIG. 2, an outlet conveyor 37 is provided inside the outlet duct 31. The outlet conveyor 37 comprises a conveyor screw that is rotated by a drive assembly 39 about a rotation axis that is parallel and coaxial with the rotation axis 10 of the dryer receptacle 3. Alternatively, the outlet conveyor 37 may comprise a rotated spiral for removing the herbaceous material from the inner space 5 of the dryer receptacle 3. As another alternative, the outlet conveyor 37 may comprise a scraper configured to move back and forth for removing the herbaceous material from the inner space 5 of the dryer receptacle 3. If the outlet conveyor 37 comprises, for example, a conveyor screw, or a rotated spiral, or a scraper, the outlet conveyor 37 comprises an active conveying system. However, the outlet conveyor 37 could also be configured as passive conveying system. In particular, the outlet conveyor 37 could comprise a chute for removing the herbaceous material from the inner space 5 of the dryer receptacle 3. The outlet conveyor 37 could be configured to remove the herbaceous material from the inner space 5 of the dryer receptacle 3 without using any actively driven components. The outlet conveyor 37 conveys herbaceous material from the inner space 5 of the dryer receptacle to an outlet 35 of the outlet system 29.

As shown in FIG. 2, the dryer receptacle 3 may be mounted on a tilting device 41 for adjusting a tilting angle of the dryer receptacle 3 with respect to a horizontal plane. In FIG. 2, the dryer receptacle 3 is in a horizontal position, meaning that the tilting angle is zero. The tilting device 41 comprises an arm 43 carrying the dryer receptacle 3. The arm 43 can be tilted via a hinge 45 and a hydraulic cylinder 47, thereby tilting the dryer receptacle 3 by raising the inlet side 9 of the dryer receptacle 3 with respect to the outlet side 11. The tilting device 41 may be configured to establish a tilting angle between 0 degrees and 90 degrees, or between 0 degrees and 60 degrees, or between 0 degrees and 45 degrees, or between 0 degrees and 30 degrees, or between 0 degrees and 15 degrees, or between 0 degrees and 10 degrees for example.

The dryer 1 can be operated in two different operational modes. In a batch mode, a load of the herbaceous material is first loaded into the dryer receptacle 3, then dried in the dryer receptacle 3, and then removed from the dryer receptacle 3. During drying, the inlet conveyor 25 and the outlet conveyor 37 may be rotated to push material at the inlet and outlet sides 9, 11 back into the inner space 5.

In detail, in the batch mode, the herbaceous material to be dried may be introduced into the inner space 5 of the dryer receptacle 3 via the inlet system 17, while the inlet side 9 of the dryer receptacle 3 is raised with respect to the outlet side 11. Preferably, the dryer receptacle 3 is rotated during introduction of the herbaceous material. When all the material has been loaded into the inner space 5 of the dryer receptacle 3, the tilting device 41 lowers the inlet side 9 of the dryer receptacle 3 until the dryer receptacle 3 is horizontally aligned. The material is then processed for a desired amount of time, while the dryer receptacle 3 is rotated. During this time, the inlet conveyor 25 and the outlet conveyor 37 may be rotated to push material at the inlet side 9 and at the outlet side 11 back into the inner space 5. After expiry of the desired time, the inlet side 9 of the dryer receptacle 3 is again raised with respect to the outlet side 11, and the rotation direction of the outlet conveyor 37 is reversed so that the outlet conveyor 37 conveys the herbaceous material to the outlet 35. During this process, the dryer receptacle 3 may still rotate.

According to a continuous mode, herbaceous material is introduced into the inner space 5 of the dryer receptacle 3 and withdrawn from the inner space 5 of the dryer receptacle 3 continuously. The inlet conveyor 25 may continuously rotate to supply herbaceous material from the inlet 23 to the inner space 5 of the dryer receptacle 3, while the outlet conveyor 37 continuously rotates to remove herbaceous material from the inner space 5 of the dryer receptacle 3 to the outlet 35. Residence time of the herbaceous material in the inner space 5 of the dryer receptacle 3 can be regulated by appropriately setting the inclination of the dryer receptacle 3 via the tilting device 41. Additionally or alternatively, the speed of rotation of the dryer receptacle 3 may be regulated.

As stated above, the dryer receptacle 3 is provided to be substantially airtight. Preferably, drying of the herbaceous material in the dryer receptacle 3 is carried out under specific atmospheric conditions. This allows better control over the process. Further, yield of high-quality dried product may be improved by controlling the atmosphere in the dryer receptacle 3. The drying process can be carried out under inert gas atmosphere in the dryer receptacle 3. Inert gases in the inner space 5 of the dryer receptacle 3 may reduce the risk of fire. In particular, when processing tobacco material, it can be beneficial to carry out the drying process under nitrogen atmosphere. The nitrogen can, in particular, function as an inert gas. Also, other inert gases or mixtures of gases comprising inert gases could be used. In particular, the atmosphere in the dryer receptacle 3 could comprise noble gases. Nitrogen or another gas or a mixture of gases may, for example be provided to the dryer receptacle 3 via a gas inlet 62. In FIG. 2, the gas inlet 62 is illustrated at the first door 13 as an example. Gases from the inner space 5 of the dryer receptacle 3 may be withdrawn via a gas outlet 80. In FIG. 2, the gas outlet 80 is illustrated at the outlet tube 31 of the outlet system 29 as an example. The drying process could also be carried out under vacuum.

Volatiles evaporated in the dryer receptacle 3 during drying of the herbaceous material may be processed. Such volatiles may, for example, comprise flavor compounds evaporated during drying of the herbaceous material, in particular during drying of tobacco material. The volatiles may, for example, carry flavor extracted from the herbaceous material. The volatiles could, for example, comprise aromatic substances or oils. The volatiles could comprise, for example, alkaloids such as nicotine. The volatiles could also comprise pyrazines such as for example: 2-methylpyrazine; 2,5-dimethylpyrazine; 2,6-dimethylpyrazine; 2-ethylpyrazine; 2,3-dimethylpyrazine; 2-ethyl-5-methylpyrazine; 2-ethyl-6-methylpyrazine; 2,3,5-trimethyl Pyrazine; tetramethylpyrazine; 2-ethyl-3,6-dimethylpyrazine; or 2-ethyl-3,5-dimethylpyrazine. Other examples of volatiles include β-ionone; β-damascenone; or acetic acid.

Figure 3A:
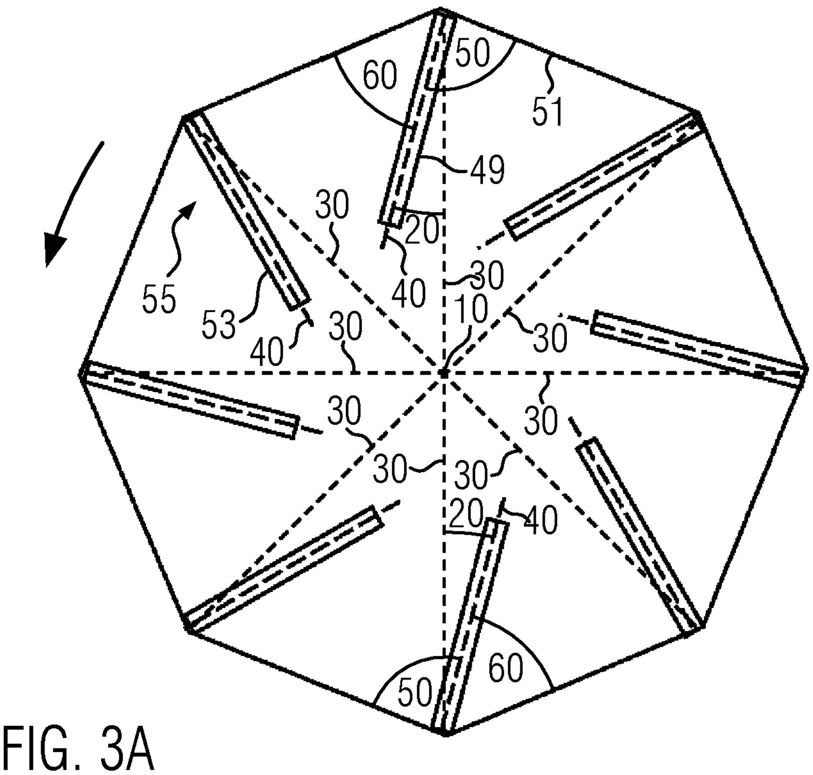
FIG. 3A is a schematic sectional view showing an inner surface of the dryer receptacle and vanes extending from the inner surface of the dryer receptacle in a sectional plane perpendicular to the rotation axis of the dryer receptacle according to an embodiment of the invention.
Figure 3B:
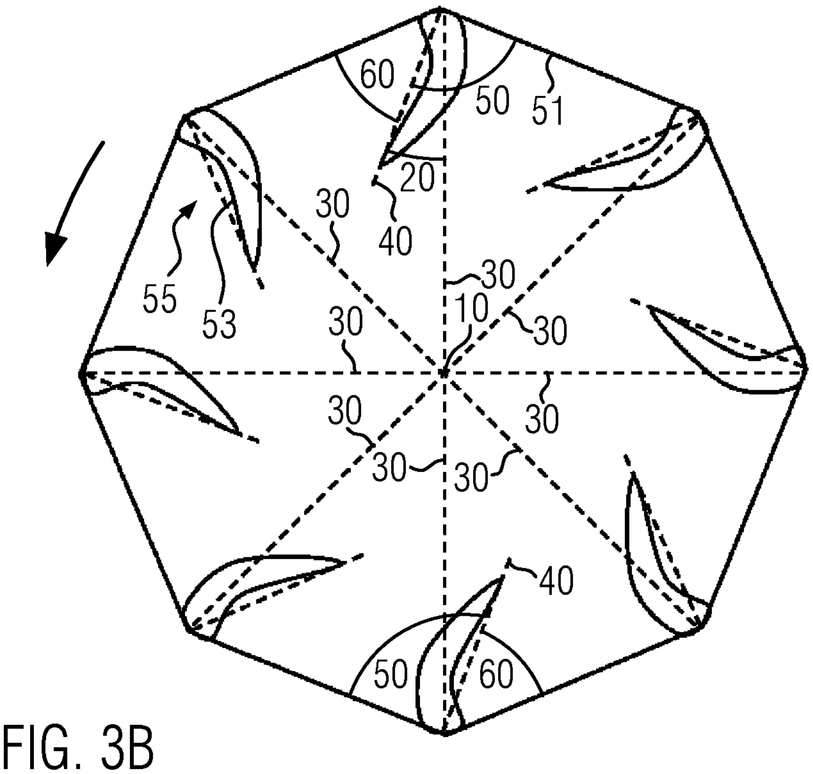
FIG. 3B is a schematic sectional view showing an inner surface of the dryer receptacle and vanes extending from the inner surface of the dryer receptacle in a sectional plane perpendicular to the rotation axis of the dryer receptacle according to an alternative embodiment according to the invention.

To increase drying efficiency and quality of the resulting products, the herbaceous material inside the dryer receptacle 3 may be agitated during drying. This may be achieved with vanes 49 extending from an inner surface 51 of the dryer receptacle 3 into the inner space 5 of the dryer receptacle 3. Respective vanes 49 according to a first exemplary embodiment are illustrated in FIG. 3A, which shows the inner surface 51 of the dryer receptacle 3 and the vanes 49 in a sectional view with a sectional plane that is perpendicular to the rotation axis 10 of the dryer receptacle 3. FIG. 3B shows a corresponding view according to a second exemplary embodiment. In the first embodiment shown in FIG. 3A, the vanes 49 have a parallelepiped shape. The vanes 49 according to the second embodiment shown in FIG. 3B have curved shapes.

According to both embodiments, the vanes 49 are, in the cross-section with the sectional plane perpendicular to the rotation axis 10 of the dryer receptacle 3, inclined with respect to the radial direction, which is radial with respect to the rotation axis 10. The angle of inclination of the vanes 49 with respect to the radial direction is illustrated as angle 20 in the figures. To define the angle, the figures show radius lines 30 connecting, in the cross-section view, the rotation axis 10 of the dryer receptacle 3 with center points of base portions of the vanes 49, the base portions being portions of the vanes 49 where the vanes 49 meet the inner surface 51 of the dryer receptacle 3. Further, the figures illustrate extension lines 40 being lines that connect the center points of the base portions of the vanes 49 with center points of far end portions of the vanes 49, the far end portions of the vanes being the portions reaching farthest into the inner space 5 of the dryer receptacle 3.

In the illustrated embodiments, the angles 20 between the vanes 49 and the radial direction are the same for each vane 49. Preferably, the angle 20 is lower than 30 degrees. In particular, the angle 20 can lie between 5 degrees and 25 degrees or more preferably between 5 degrees and 15 degrees.

The arrows in FIGS. 3A and 3B illustrate the direction of rotation of the dryer receptacle 3. As illustrated, the inclination of the vanes 49 is such that in the sectional plane perpendicular to the rotation axis 10 of the dryer receptacle 3, angles between the vanes 49 and the inner surface 51 of one of the dryer receptacle 3 are larger when measured in the direction of rotation of the dryer receptacle 3 than when measured against the direction of the rotation of the dryer receptacle 3. The angles are in both cases measured starting from the respective vane 49 and ending at the inner surface 51 of the dryer receptacle 3. The larger angle measured in the direction of rotation of the dryer receptacle 3 is indicated as angle 50 in the figures, whereas the smaller angle measured against the direction of rotation of the dryer receptacle 3 is indicated as 60. Angles 50 and 60 are again defined referring to the extension lines 40 of the vanes 49. Generally, in case of nonlinear portions of the inner surface 51 of the dryer receptacle 3, the angles 50 and 60 may be measured with reference to tangent lines to the inner surface 51 of the dryer receptacle 3 at the center of the base portion of the respective vane 49.

As can be understood from FIGS. 3A and 3B, engagement surfaces 53 of the vanes 49 will engage herbaceous material received in the dryer receptacle 3, when the dryer receptacle 3 is rotated about the rotation axis 10 in the direction of rotation of the dryer receptacle 3. The inclination of the vanes 49 enables the vanes 49 to better engage the herbaceous material. Further, due to the inclination of the vanes 49, pockets 55 are formed between the vanes 49 and the inner surface 51 of the dryer receptacle 3. The pockets 55 can temporarily hold herbaceous material during rotation of the dryer receptacle 3. Due to the inclination of the vanes 49, the holding time of the herbaceous material in the pockets 55 is increased, thereby increasing overall agitation in the dryer receptacle 3. Further, if the vanes 49 are heated (see below description), the increased contact time between the inclined vanes 49 and the herbaceous material increases heating efficiency.

As the vanes 49 shown in FIG. 3B are curved in the direction of inclination of the vanes 49, large quantities of herbaceous material can be picked up by the vanes 49. The curvature of the vanes 49 may also increase contact time between the vanes 49 and the herbaceous material, as curved vanes 49 may let the herbaceous material slip later than straight vanes during rotation of the dryer receptacle 3.

Preferably, an arch distance between two adjacent vanes 49 with respect to the rotation axis 10 is equal to or greater than a height dimension of the vanes 49. This can ensure that adjacent vanes 49 do not too strongly interfere with picking up herbaceous material by the vane 49.

Figure 4:
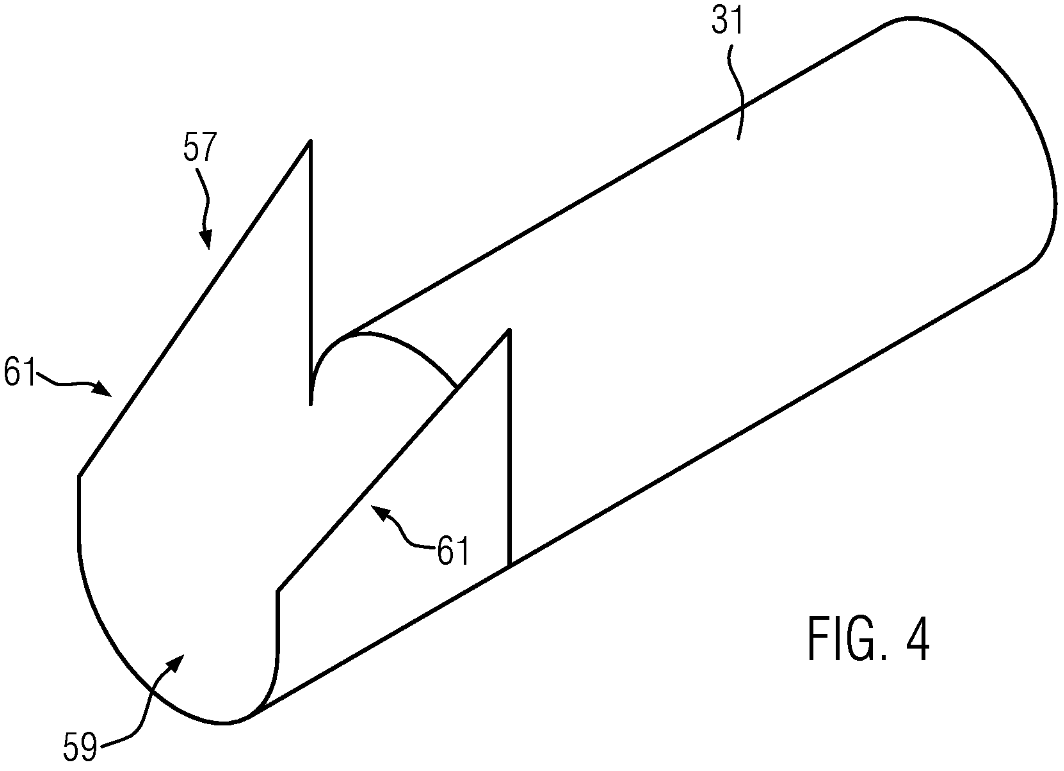
FIG. 4 is a schematic perspective view of a channel-shaped collector and a part of a conveyor tube according to the embodiment of the invention.
Figure 5:
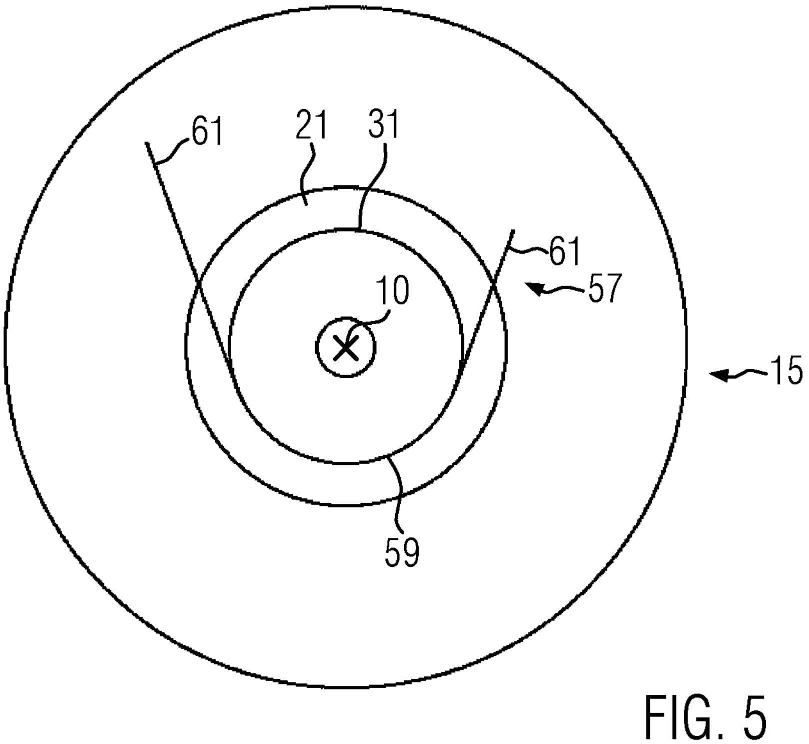
FIG. 5 is a schematic view of an inner surface of a door of the dryer receptacle according to the embodiment of the invention in a view from an inside of the dryer receptacle, when the door is closed.

As shown in FIGS. 2 and 5, a collector 57 is provided in the inner space 5 of the dryer receptacle 3 at the outlet side 11. In the illustrated embodiment, the collector 57 is integrally formed with the outlet tube 31 of the outlet system 29. However, it is not required that the collector 57 and the outlet tube 31 are integrally formed. For example, the collector 57 could be fixed to the outlet tube 31 or another structure of the dryer 1. The collector 56 is stationary and does not rotate together with the dryer receptacle 3. FIG. 4 shows a schematic perspective view of the collector 57 and the outlet duct 31. The collector 57 is channel-shaped and is open in its upper portion. The collector 57 has at least two sections which are extending in different directions. The collector 57 can, for example, be essentially U-shaped or essentially V-shaped or essentially UN-shaped. In particular, the collector 57 may have a center section 59 forming a bottom of the collector 57 and two side sections 61 upwardly extending from opposing ends of the center section 59. The distance between the side sections 61 can increase in a direction away from the center section 59 (upwards direction). When the dryer receptacle 3 is rotated about its rotation axis 10, herbaceous material inside the dryer receptacle 3 is agitated. During rotation of the dryer receptacle 3, herbaceous material may enter the collector 57. In particular, herbaceous material may be agitated and picked up by the vanes 49 and fall by gravity into the collector 57. The divergence of the side sections 61 of the collector 57 in the upwards direction leads to a funnel effect funneling herbaceous material falling due to gravity toward the center section 59 of the collector 57.

The collector 57 constitutes a simple and effective way of collecting herbaceous material in the inner space 5 of the dryer receptacle. In particular, the collector 57 can be constituted by or comprise a curved plate defining the center section 59 and the side sections 61.

According to the illustrated embodiment, at least a portion of an upper rim of the collector 57 defining the top opening of the collector 57 is slanted downwards. In particular, upper rims of the side sections 61 of the collector 57 may be slanted downwards. Herbaceous material falling onto the slanted rim from above may slide down the slanted rim instead of remaining at the rim or sticking to the rim.

FIG. 5 shows a view on the inner surface of the second door 15 from inside the dryer receptacle 3. As illustrated, the rotation axis 10 of the dryer receptacle 3 extends within the collector 57. In particular, the collector 57 extends in parallel to the rotation axis 10 of the dryer receptacle 3. The outlet conveyor 37 extends through the outlet duct 31 into the collector 57 to convey herbaceous material collected in the collector 57 towards the outlet 35.

In the illustrated embodiment, the collector 57 is asymmetrical with respect to a plane defined by the rotation axis 10 and a vertical direction. The asymmetric shape of the collector 57 may facilitate collecting herbaceous material during rotation of the dryer receptacle 3. In particular, one of the side sections 61 of the collector 57 may be longer than the other side section 61 of the collector 57. The shorter side section 61 may facilitate entry of the herbaceous material into the collector 57. The longer side section 61 may contribute to holding the herbaceous material in the collector 57. Preferably, the dryer receptacle 3 is rotated such that the shorter side section 61 is downstream of the longer side section 61 with respect to the rotation direction of the dryer receptacle 3.

The collector 57 could also be is asymmetrical with respect to the plane defined by the rotation axis 10 and a vertical direction in other ways. For example, the shapes or the dimensions or the shapes and the dimensions of the side sections 61 of the collector 57 could differ from each other. Also, the orientations of the side sections 61 of the collector 57 could differ from each other. Alternatively, the collector 57 could be symmetrical with respect to the plane defined by the rotation axis 10 and the vertical direction.

As illustrated in FIG. 2, a liquid dispersion assembly having two nozzles 61 is provided. The nozzles 61 are provided at the ends of the conveyor screw of the inlet conveyor 25 and the conveyor screw of the outlet conveyor 37, respectively. Inside the respective conveyor screw, a channel 63 is provided for supplying liquid to the nozzle 61. The nozzles 61 are configured to spray liquid inside the inner space 5 of the dryer receptacle 3. During drying of herbaceous material, liquids for treating the herbaceous material may be sprayed through the nozzles 61. Further, when the dryer receptacle 3 is to be cleaned between uses, cleaning liquid can be sprayed by the nozzles 61. As the nozzles 61 rotate, they can reach even spots that are usually difficult to reach for cleaning. The nozzles 61 may be set to rotate together with the respective conveyor screw. Alternatively, the nozzles 61 could be decoupled from the conveyor screws. For example, the nozzles 61 could be rotated by the liquid spraying out of the nozzles 61.

To facilitate drying of the herbaceous material, the dryer 1 comprises a heating system 65. The heating system 65 comprises multiple heating elements, which can comprise wall heating elements 67, vane heating elements 69, door heating elements 71, conveyor heating elements 73, and one or more collector heating elements 74. The wall heating elements 67 can be incorporated into the circumferential wall of the main body 7 of the dryer receptacle 3. The vane heating elements 69 can be incorporated into the vanes 49 protruding inside the inner space 5 of the dryer receptacle 3. The door heating elements 71 can be incorporated into the first and second doors 13, 15 of the dryer receptacle 3. The conveyor heating elements 73 can be incorporated into the inlet conveyor 25 and the outlet conveyor 37. The collector heating elements 74 may be incorporated into the collector 57. Wall heating elements 67, vane heating elements 69, and door heating elements 71 are illustrated in FIG. 2. The conveyor heating elements 73 and the collector heating elements 74 are not illustrated in FIG. 2 for the sake of clarity. Conveyor heating elements 73 could, for example, be incorporated into the conveyor screw of the inlet conveyor 25. Alternatively or additionally, conveyor heating elements 73 could, for example, be incorporated into the outlet conveyor 37. Conveyor heating elements 73 could also be incorporated into the inlet tube 19. Alternatively or additionally, conveyor heating elements 73 could also be incorporated into the outlet tube 31.

The first and second doors 13, 15 and the inlet and outlet conveyors 25, 37 are part of access assemblies providing access to the inner space 5 of the dryer receptacle 3. Heating such access assemblies by the door heating elements 71 and the conveyor heating elements 73 facilitates maintaining a certain temperature level in the dryer receptacle 3. If only wall heating elements 67 and vane heating elements 69 were present, parts of access assemblies, such as the doors 13, 15 or the conveyors 25, 37 might provide space for the formation of lower temperature spots. At lower temperature spots, gaseous material generated during drying of the herbaceous material in the dryer receptacle 3 could condensate, which could negatively influence drying efficiency and quality of the dried material.

Heating the vanes 49 with the vane heating elements 69 incorporated in the vanes 49 is highly effective, as the vanes 49 come in direct contact with large amounts of herbaceous material, when agitating the herbaceous material. Further, as the vanes 49 are inclined, the duration of contact between the herbaceous material and the vanes 49 is increased. That may increase heating efficiency.

Heating the collector 57 with the collector heating elements 74 may contribute to removing residual moisture before the herbaceous material leaves the inner space 5 of the dryer receptacle 3.

Figure 6:
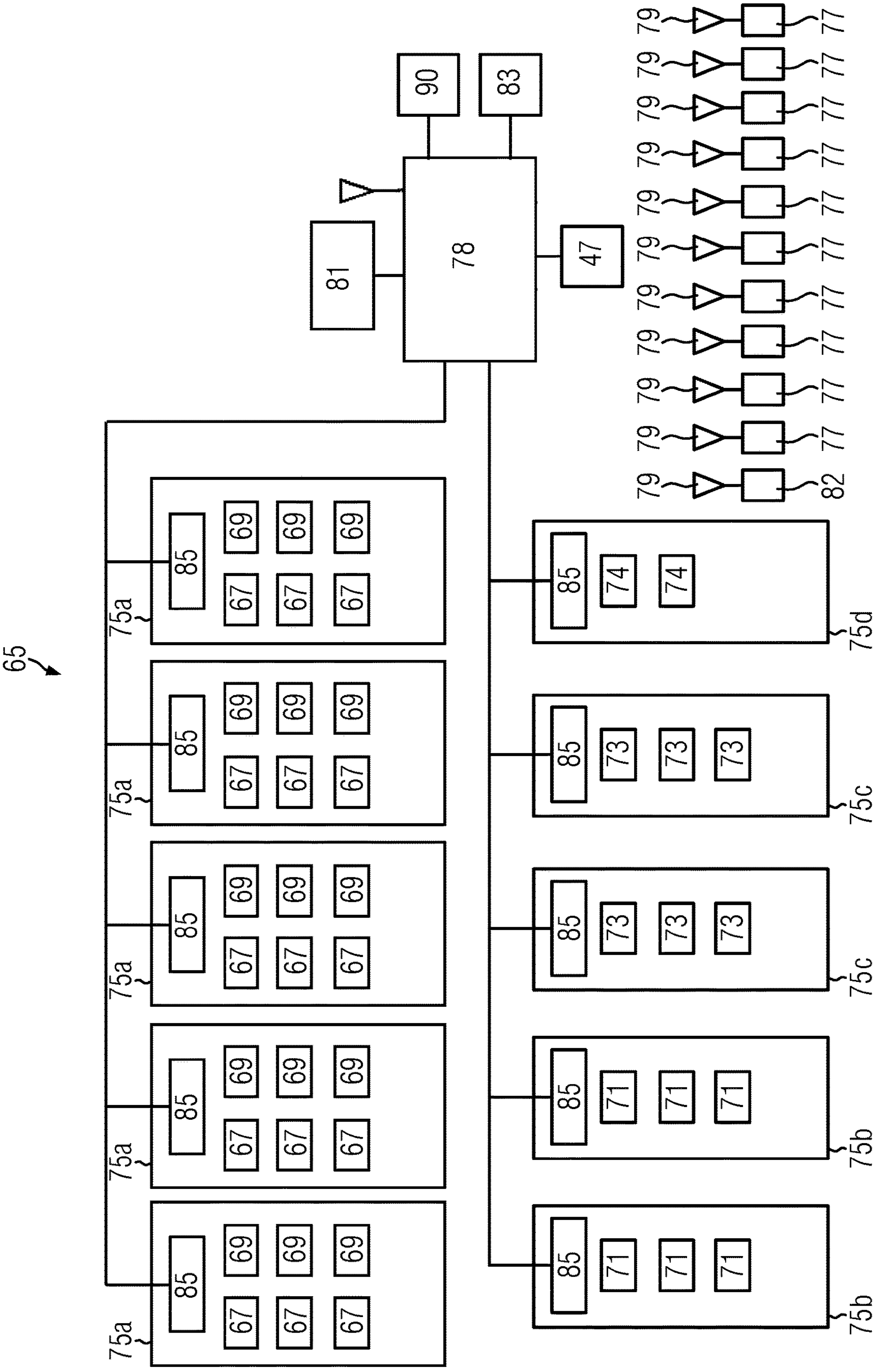
FIG. 6 is a block diagram schematically showing a control scheme of the dryer according to the embodiment of the invention, in particular with respect to the heating system of the dryer.

The block diagram shown in FIG. 6 shows a control scheme of the heating system 65. The heating elements 67, 69, 71, 73, 74 are grouped into heating sub-systems 75, which are controlled independently of each other by a controller 78.

According to the illustrated embodiment, five distinct main body heating sub-systems **75*a* are provided. Each of the main body heating sub-systems 75*a* comprises a plurality of wall heating elements 67 and a plurality of vane heating elements 69. An alternative would be to provide separately controlled wall heating sub-assemblies and vane heating sub-assemblies instead of providing main body heating sub-assemblies 75*a* comprising both wall heating elements 67 and vane heating elements 69. As shown in FIG. 2, there are five columns of wall heating elements 67 and five columns of vane heating elements 69 along the direction of extension of the rotation axis 10 of the dryer receptacle 3. Those correspond to the five main body heating sub-systems 75*a*. This means that, according to the illustrated embodiment, the wall heating elements 67 and the vane heating elements 69 are grouped into the main body heating sub-assemblies 75*a* by defining groups of heating elements 67, 69 that lie one behind the other along a direction parallel to the rotation direction A of the dryer receptacle 3. Independent control of the main body heating sub-assemblies 75*a* by the controller 78 allows establishing independently controlled heating zones along the extension direction of the rotation axis 10 of the dryer receptacle 3**.

According to the illustrated embodiment, the heating system 65 further comprises two door heating sub-assemblies **75*b*. Each of the door heating sub-assemblies 75*b* comprises the door heating elements 71 incorporated into a corresponding one of the first and second doors 13, 15. Independent control of the two door heating sub-assemblies 75*b* by the controller 78 allows, for example, heating the first and second doors 13, 15 to different temperatures. Also, the first and second doors 13, 15** could be heated to the same target temperature, but with different feedback control parameters.

Further, according to the illustrated embodiment, the heating system 65 comprises two conveyor heating sub-systems **75*c*. The conveyor heating sub-systems 75*c* may comprise the conveyor heating elements 73 of a corresponding one of the inlet conveyor 25 and the outlet conveyor 37**.

Further, according to the illustrated embodiment, the heating system 65 comprises a collector heating sub-system **75*d*. The collector heating sub-system 75*d* may comprise the one or more collector heating elements 74**.

FIG. 6 schematically illustrates temperature sensors 77 distributed at appropriate places at the dryer 1 to measure temperatures corresponding to respective heating sub-systems 75. FIG. 6 illustrates ten temperature sensors 77, one for each of the heating sub-systems 75. The temperature sensors 77 are provided with wireless transmission devices 79 wirelessly transmitting the respective temperature sensor values to the controller 78. Alternatively, there could be a wired connection between the temperature sensors 77 and the controller 78. The controller 78 controls each of the heating sub-systems 75 based on an output of the corresponding temperature sensor 77. In the illustrated embodiment, the heating sub-systems 75 are all controlled independently of each other based on the sensing value from the respective temperature sensor 77. However, it would also be conceivable to group some or all of the heating sub-systems 75 to be controlled together or to at least be controlled based on an output of the same temperature sensor 77.

Having independently controlled heating sub-assemblies 75 provides a high level of control over the temperature distribution in the dryer receptacle 3 during drying of the herbaceous material. Therefore, the drying process can be accurately controlled and adjusted to obtain high-quality products. Depending on the herbaceous material to be treated and on the desired properties of the products to be obtained, different principles of operating the heating sub-systems 75 are conceivable. For example, the main body heating sub-assemblies **75*a* could be controlled to provide a temperature gradient in the inner space 5 of the dryer receptacle 3 along an extension direction of the rotation axis 10 of the dryer receptacle 3. This could, for example, be achieved by using different temperature target values for control of the different main body heating sub-assemblies 75*a*. For example, the temperature gradient could be such that a temperature is higher at the inlet side 9 of the dryer receptacle 3 and a temperature is lower at the outlet side 11** of the dryer receptacle 3. Alternatively, the temperature gradient could be established such that the temperature is lower at the inlet side 9 of the dryer receptacle 3 and higher at the outlet side 11 of the dryer receptacle 3. A respective temperature difference between the inlet and outlet sides 9 could be, at least 10 degrees Celsius, at least 20 degrees Celsius, at least 30 degrees Celsius, at least 50 degrees Celsius, at least 100 degrees Celsius, or more than 100 degrees Celsius, for example.

It would also be conceivable to use the same temperature target values for all main body heating sub-assemblies 75*a*, but to use the sensing values from the different temperature sensors 77 for the respective main body heating sub-assemblies 75*a* for independent control adapted to the characteristics of the main body heating sub-assemblies 75*a*, such as heat capacity, thereby achieving a highly even temperature throughout the longitudinal direction of the dryer receptacle 3.

The door heating sub-assemblies 75*b* and the conveyor heating sub-assemblies 75*c* are preferably controlled to maintain at least a predetermined minimum temperature, which is also called minimum access assembly temperature, at the doors 13, 15 or the inlet and outlet conveyors 25, 37, respectively. The minimum access assembly temperature could be selected such that the formation of lower temperature spots at the access assembly, in particular at the doors 13, 15 or the conveyors 25, 37, is prevented. Preventing lower temperature spots may prevent condensation of gaseous material generated during drying of the herbaceous material at such spots.

The door heating sub-assemblies 75*b* is preferably controlled based on different temperature target values for the first door 13 and the second door 15. This could, in particular, be done in combination with a temperature gradient established by appropriately controlling the main body heating sub-assemblies 75*a*.

Temperature target values for the respective heating subsystems 75 could be entered by a user via an input device 81. Alternatively or additionally, temperature target values for the respective heating sub-systems 75 could be stored in a memory device 83.

FIG. 6 also illustrates an optional pressure sensor 82. The pressure sensor 82 may be configured to determine a pressure in the inner space 5 of the dryer receptacle 3. If superheated steam is used for heating the inner space 5 of the dryer receptacle 3, a temperature within the inner space 5 of the dryer receptacle may be deduced from the determined pressure. The pressure determined by the pressure sensor 82 may be wirelessly transmitted to the controller 78 and be used for controlling one or more of the heating sub-assemblies 75.

In FIG. 6, each of the heating sub-systems 75 comprises an actuator 85 that is controlled by the controller 78 to appropriately actuate the respective heating elements 67, 69, 71, 73, 74. The actuators may, for example, comprise electrical circuitry for supplying resistance heating elements with electrical power or pumps or valves for providing heating elements that are configured as heating fluid lines with appropriately heated fluid.

Further, the controller 78 may be configured for controlling a driving device 90 for rotating the dryer receptacle 3 about the rotation axis 10. Preferably, the controller 78 is configured to control the driving device 90 to rotate the dryer receptacle 3 exclusively in one direction of rotation. However, the controller 78 may also be configured to control the driving device 90 to change a rotation direction of the dryer receptacle 3. In particular, the rotation direction of the dryer receptacle 3 could be changed at intervals to improve distribution of the herbaceous material within the dryer receptacle 3. The controller 78 may also control the hydraulic cylinder 47 of the tilting device 41.

The invention claimed is:

1. A rotary dryer for drying herbaceous material, comprising:

a dryer receptacle having an inner space for receiving herbaceous material;

a driving device for rotating the dryer receptacle about a rotation axis of the dryer receptacle; and a channel-shaped collector being at least partially open in its upper portion and provided in the inner space of the dryer receptacle for collecting and retaining dried herbaceous material, wherein the channel-shaped collector is stationary during rotation of the dryer receptacle; and wherein the channel-shaped collector is asymmetrical with respect to a plane defined by the rotation axis of the dryer receptacle and a vertical direction extending through a center of the channel-shaped collector.

2. The rotary dryer according to claim 1, wherein the channel-shaped collector extends at least substantially parallel to the rotation axis.

3. The rotary dryer according to claim 1, wherein the rotation axis of the dryer receptacle extends within the channel-shaped collector.

4. The rotary dryer according to claim 1, wherein the channel-shaped collector is located at an end portion of the dryer receptacle with respect to the rotation axis.

5. The rotary dryer according to claim 1, wherein the channel-shaped collector is provided at a door of the dryer receptacle.

6. The rotary dryer according to claim 1, wherein a cross-section of the channel-shaped collector has two sections extending in different directions, wherein a distance between the two sections increases in an upwards direction.

7. The rotary dryer according to claim 6, wherein a shorter section of the two sections is shorter than a longer section of the two sections.

8. The rotary dryer according to claim 7, wherein a length of the shorter section is at least 60 percent of a length of the longer section, or at least 70 percent of the length of the longer section.

9. The rotary dryer according to claim 1, further comprising an outlet conveyor configured to remove the dried herbaceous material collected in the channel-shaped collector from the inner space of the dryer receptacle.

10. The rotary dryer according to claim 9, wherein the outlet conveyor comprises a conveyor extending in the channel-shaped collector and out of the dryer receptacle.

11. The rotary dryer according to claim 10, wherein a nozzle for spraying fluid is provided at the conveyor reaching into the inner space of the dryer receptacle.

12. The rotary dryer according to claim 10, wherein a nozzle for spraying fluid is provided at the conveyor reaching into the inner space of the dryer receptacle beyond the channel-shaped collector.

13. The rotary dryer according to claim 1, wherein a dimension of the channel-shaped collector in a direction perpendicular to the rotation axis is smaller than half of a dimension of the inner space of the dryer receptacle in the direction perpendicular to the rotation axis.

14. The rotary dryer according to claim 1, further comprising a collector heating element configured to heat the channel-shaped collector.

15. The rotary dryer according to claim 1, wherein the dryer receptacle is configured to rotate around the channel-shaped collector.

16. A method for drying herbaceous material, the method comprising:

rotating a dryer receptacle receiving the herbaceous material about a rotation axis of the dryer receptacle; and collecting dried herbaceous material in the dryer receptacle in a collector comprising a plate partially surrounding the rotation axis, wherein the collector is decoupled from the rotation of the dryer receptacle, and the collector is provided at a door of the drier receptacle; and wherein the collector is asymmetrical with respect to a plane defined by the rotation axis of the dryer receptacle and a vertical direction.

17. The method according to claim 16, wherein the dryer receptacle rotates around the collector.

18. A method for drying herbaceous material, the method comprising:

collecting and retaining, with a curved plate, dried herbaceous material during a drying process of the herbaceous material in a dryer receptacle rotating about a rotation axis of the dryer receptacle, wherein the curved plate is stationary during rotation of the dryer receptacle and the curved plate is asymmetrical with respect to a plane defined by the rotation axis of the dryer receptacle and a vertical direction.

19. The method according to claim 18, wherein the dryer receptacle rotates around the curved plate.

* * * * *